United States Patent
Zhang et al.

(10) Patent No.: US 11,113,513 B2
(45) Date of Patent: Sep. 7, 2021

(54) APPARATUS AND METHOD FOR TRAINING CLASSIFICATION MODEL AND APPARATUS FOR CLASSIFYING WITH CLASSIFICATION MODEL

(71) Applicant: FUJITSU LIMITED, Kanagawa (JP)

(72) Inventors: Meng Zhang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 16/738,393

(22) Filed: Jan. 9, 2020

(65) Prior Publication Data

US 2020/0265220 A1    Aug. 20, 2020

(30) Foreign Application Priority Data

Feb. 19, 2019  (CN) .......................... 201910122211.5

(51) Int. Cl.
  *G06K 9/46*     (2006.01)
  *G06K 9/00*     (2006.01)
  (Continued)

(52) U.S. Cl.
  CPC ....... *G06K 9/00288* (2013.01); *G06K 9/6256* (2013.01); *G06K 9/6267* (2013.01); *G06N 3/08* (2013.01)

(58) Field of Classification Search
  CPC ........... G06K 9/00261; G06K 9/00288; G06K 9/00228; G06K 9/00268; G06K 9/00281;
  (Continued)

(56) References Cited

U.S. PATENT DOCUMENTS

| 2008/0144943 A1* | 6/2008 | Gokturk | G06T 7/0002 382/224 |
| 2015/0294191 A1* | 10/2015 | Zhang | G06N 20/00 382/160 |
| 2017/0270664 A1* | 9/2017 | Hoogi | A61B 6/5217 |

FOREIGN PATENT DOCUMENTS

| CN | 105590102 A | 5/2016 |
| CN | 106548165 A | 3/2017 |

(Continued)

OTHER PUBLICATIONS

Extended Search Report dated Jul. 21, 2020, issued in counterpart EP Applciation No. 20150950.2 (9 pages).

(Continued)

*Primary Examiner* — Quan M Hua
(74) *Attorney, Agent, or Firm* — Westerman, Hattori, Daniels & Adrian, LLP (57) ABSTRACT

An apparatus and method for training a classification model and an apparatus for classifying with a classification model are disclosed. The apparatus for training a classification model comprises: a local area obtainment unit to, obtain predetermined local area of each sample image; a feature extraction unit to, with respect to each sample image, set corresponding numbers of feature extraction layers for the global area and each predetermined local area, to extract a global feature of the global area and a local feature of each predetermined local area, wherein the global area and the predetermined local areas share at least one feature extraction layer in which the global feature and each local feature are combined; and a loss determination unit to calculate a loss function of the sample image based on combined features of each sample image, and to train the classification model based on the loss function.

14 Claims, 7 Drawing Sheets

(51) Int. Cl.
*G06K 9/62* (2006.01)
*G06N 3/08* (2006.01)

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80
See application file for complete search history.

(56) References Cited

FOREIGN PATENT DOCUMENTS

| CN | 108319943 A | 7/2018 |
|---|---|---|
| CN | 108491835 A | 9/2018 |
| CN | 108875548 A | 11/2018 |

OTHER PUBLICATIONS

Zhang, Ke et al., "Fine-Grained Age Group Classification in the wild", 2018 24th International Conference on Pattern Recognition, IEEE, China, Aug. 20, 2018, pp. 788-793; Cited in EP Office Action dated Jul. 21, 2020.

\* cited by examiner

```
┌─────────────────────────────────────────┐
│ With respect to each sample image in training set, obtain │──── S402
│ predetermined number of predetermined local areas of sample │
│                    image                │
└─────────────────────────────────────────┘
                      │
                      ▼
┌─────────────────────────────────────────┐
│ With respect to each sample image, setting corresponding │
│ numbers of feature extraction layers for global area and each │
│ predetermined local area respectively, to extract global feature │
│ of global area and local feature of each predetermined local area │
│ respectively, wherein global area and predetermined number of │──── S404
│ predetermined local areas share at least one layer of feature │
│ extraction layers set with respect to global area and each │
│ predetermined local area respectively, to combine global feature │
│ and each local feature in at least one shared layer │
└─────────────────────────────────────────┘
                      │
                      ▼
┌─────────────────────────────────────────┐
│ Calculate, with loss determination layer, loss function of sample │──── S406
│ image based on combined features of each sample image, and │
│ train classification model based on loss function │
└─────────────────────────────────────────┘
```

```
┌─────────────────────────────────────────────┐
│ Obtain predetermined number of predetermined│ ── S602
│    local areas of image to be classified    │
└─────────────────────────────────────────────┘
                      │
                      ▼
┌─────────────────────────────────────────────────┐
│ Extract, with feature extraction layers in      │
│ classification model which are set for global   │
│ area and each predetermined local area,         │
│ a global feature of global area and a local     │
│ feature of each predetermined local area        │
│ respectively, wherein in classification         │ ── S604
│ model, global area and predetermined number of  │
│ predetermined local areas share at least one    │
│ layer of feature extraction layers set          │
│ with respect to global area and each            │
│ predetermined local area respectively, to       │
│ combine global feature and each local feature in│
│         at least one shared layer               │
└─────────────────────────────────────────────────┘
                      │
                      ▼
┌─────────────────────────────────────────────────┐
│ Calculate, with loss determination layer in     │
│ classification model, loss function of image    │ ── S606
│ to be classified based on combined features     │
│ of image to be classified, and classify image   │
│ to be classified based on loss function         │
└─────────────────────────────────────────────────┘
```

APPARATUS AND METHOD FOR TRAINING CLASSIFICATION MODEL AND APPARATUS FOR CLASSIFYING WITH CLASSIFICATION MODEL

CROSS-REFERENCE TO RELATED APPLICATIONS

This application claims the priority benefit of Chinese Patent Application No. 201910122211.5, filed on Feb. 19, 2019 in the China National Intellectual Property Administration, the disclosure of which is incorporated herein in its entirety by reference.

FIELD OF THE INVENTION

The present disclosure relates to the field of information processing, and particularly to an apparatus and method for training a classification model, and an apparatus and method for classifying with a classification model.

BACKGROUND

In recent years, due to the collection of large-scale human face data, vehicle data and the like and the application of convolutional neural networks, classification techniques such as human face recognition and vehicle license plate recognition and the like have gained great development and been widely applied in both academia and industry. At present, the main concept of improving the performance of classification such as human face recognition and vehicle license plate recognition and the like is improving the performance of a classification model. However, upon occurrence of a problem such as a great change in postures, low resolution, poor quality and the like in an application scenario, the classification performance will be significantly lowered. Further, it is possible to improve the classification performance by increasing data. However, it is laborious and arduous to collect large-scale data. As for human face data, there are public human face data sets such as VGG2Face, Ms-Celeb-1M, MegaFace and the like nowadays. Each data set has respective advantages and disadvantages, and it is possible to efficiently improve the classification performance by sufficiently utilizing advantages of each data set. The simplest method is directly putting a plurality of data sets together, but data in different data sets has crosses, and thus a circumstance where same data is labeled differently in different data sets would easily occur. In the case in which a plurality of data sets are simply fused together, a trained classification model would be easily caused to not converge or have worse performance.

SUMMARY OF THE INVENTION

A brief summary of the present disclosure is given below to provide a basic understanding of some aspects of the present disclosure. It should be understood that the summary is not an exhaustive summary of the present disclosure. It does not intend to define a key or important part of the present disclosure, nor does it intend to limit the scope of the present disclosure. The object of the summary is only to briefly present some concepts, which serves as a preamble of the detailed description that follows.

In view of the above problem, an object of the present invention is to provide an apparatus and method for training a classification model, and an apparatus and method for classifying with a trained classification model which are capable of solving one or more drawbacks in the prior art.

According to an aspect of the present disclosure, there is provided an apparatus for training a classification model, including: a local area obtainment unit configured to, with respect to each sample image in a training set, obtain a predetermined number of predetermined local areas of the sample image, wherein each predetermined local area is a part of a global area of the sample image; a feature extraction unit configured to, with respect to each sample image, set corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination unit configured to calculate, with a loss determination layer, a loss function of the sample image based on combined features of each sample image, and to train the classification model based on the loss function.

According to another aspect of the present disclosure, there is provided a method for training a classification model, including: a local area obtainment step of, with respect to each sample image in a training set, obtaining a predetermined number of predetermined local areas of the sample image, wherein each predetermined local area is a part of a global area of the sample image; a feature extraction step of, with respect to each sample image, setting corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination step of calculating, with a loss determination layer, a loss function of the sample image based on combined features of each sample image, and training the classification model based on the loss function.

According to still another aspect of the present disclosure, there is provided an apparatus for classifying with a classification model, including: a second local area obtainment unit configured to obtain a predetermined number of predetermined local areas of an image to be classified, wherein each predetermined local area is a part of a global area of the image to be classified; a second feature extraction unit configured to extract, with corresponding numbers of feature extraction layers in the classification model which are set for the global area and each predetermined local area, a global feature of the global area and a local feature of each predetermined local area respectively, wherein in the classification model, the global area and the predetermined number of predetermined local areas share at least one layer of the corresponding numbers of feature extraction layers set with respect to the global area and each predetermined local area respectively, to combine the global feature and each local feature in the at least one shared layer; and a second loss determination unit configured to calculate, with a loss determination layer in the classification model, a loss function of the image to be classified based on combined features of the image to be classified, and to classify the image to be classified based on the loss function.

According to other aspects of the present disclosure, there is further provided a computer program code and a computer program product for implementing the above-mentioned method according to the present disclosure.

Other aspects of embodiments of the present disclosure are given in the following specification part, wherein preferred embodiments for sufficiently disclosing embodiments of the present disclosure are described in detail, without applying limitations thereto.

BRIEF DESCRIPTION OF THE DRAWINGS

The present disclosure may be better understood with reference to the detailed description given in conjunction with the drawings hereinafter. The same or similar components are denoted with the same or similar reference signs throughout the drawings. The drawings, together with the detailed description below, are incorporated in the specification and form a part of the specification, for further illustrating preferred embodiments of the present disclosure and explaining the principle and advantages of the present disclosure. In the drawings.

DETAILED DESCRIPTION OF THE INVENTION

Hereinafter, exemplary embodiments of the present disclosure will be described in combination with the drawings. For the sake of clarity and conciseness, not all of features of actual embodiments are described in the specification. However, it should be understood that in developing any such actual embodiment, many decisions specific to the embodiments must be made, so as to achieve specific objects of a developer; for example, those limitation conditions related to a system and service are met, and these limitation conditions may vary as embodiments are different. Further, it should also be appreciated that although developing tasks may be complicated and time-consuming, such developing tasks are only routine tasks for those skilled in the art benefiting from the present disclosure.

It should also be noted herein that, to avoid the present disclosure from being obscured due to unnecessary details, only those device structures and/or processing steps closely related to the solution according to the present disclosure are shown in the drawings, while omitting other details not closely related to the present disclosure.

Embodiments according to the present disclosure will be described in detail in combination with the drawings below.

Figure 1:
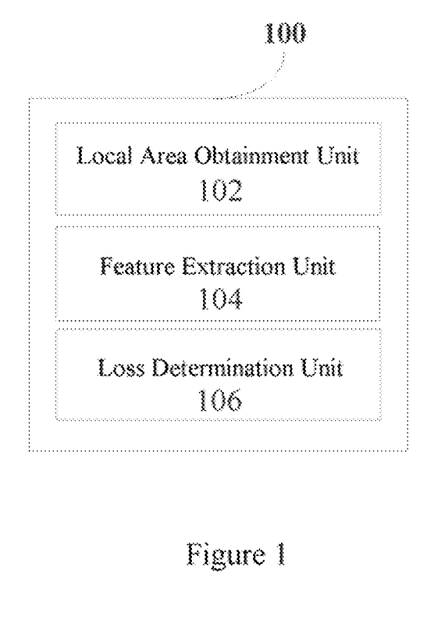
FIG. 1 is a block diagram showing a functional configuration example of an apparatus for training a classification model according to an embodiment of the present disclosure.

Firstly, a functional configuration example of an apparatus 100 for training a classification model according to an embodiment of the present disclosure will be described with reference to FIG. 1. FIG. 1 is a block diagram showing a functional configuration example of the apparatus 100 for training a classification model according to the embodiment of the present disclosure. As shown in FIG. 1, the apparatus 100 for training a classification model according to the embodiment of the present disclosure includes a local area obtainment unit 102, a feature extraction unit 104, and a loss determination unit 106.

The local area obtainment unit 102 may be configured to, with respect to each sample image in a training set, obtain a predetermined number of predetermined local areas of the sample image, wherein each predetermined local area is a part of a global area of the sample image.

As an example, the global area is an entire area of the sample image, and the local area is a partial area of the entire area of the sample image.

Taking the sample image being a human face image as an example, the local area obtainment unit 102 may divide a human face into a predetermined number of human face image blocks according to information on 5 key points (information on both eyes, a nose, and both mouth corners) of the human face, so as to obtain local areas, such as an area including an eye, an area including a nose, an area including a mouth and the like, of each sample image. The sample image may be a human face, and may also be a vehicle license plate, etc. In the local area obtainment unit 102, processing similar to the above-mentioned processing may be performed on an image (e.g., a vehicle license plate image) other than a human face image.

Figure 2:
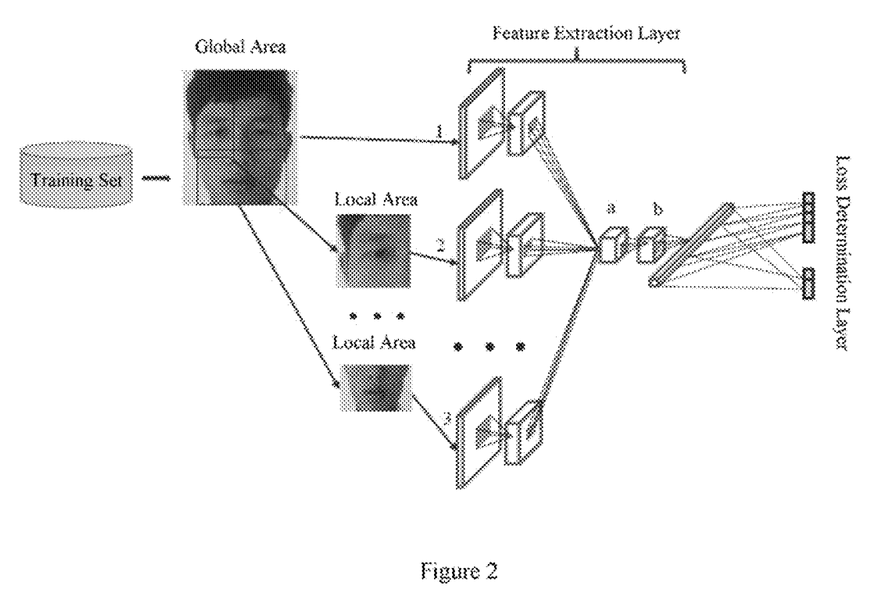
FIG. 2 is a view schematically showing a structural configuration example of the apparatus for training a classification model according to the embodiment of the present disclosure.

FIG. 2 is a view schematically showing a structural configuration example of the apparatus 100 for training a classification model according to the embodiment of the present disclosure.

As shown in FIG. 2, there is one training set. For a human face sample image in the training set, a local area including an eye, a local area including a nose and a mouth and the like of the sample image are obtained.

The feature extraction unit 104 may be configured to, with respect to each sample image, set corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer.

As an example, the feature extraction layers may be convolution layers of a convolutional neural network. Those skilled in the art can understand that, the feature extraction layers may be other structures, which will not be repeatedly described herein.

Setting corresponding numbers of feature extraction layers for the global area and each predetermined local area respectively means: numbers of feature extraction layers set for the global area and each predetermined local area respectively may be different from each other.

Preferably, the global area and the predetermined number of predetermined local areas share the last layer of feature extraction layers set with respect to the global area and share the last layer of feature extraction layers set with respect to each predetermined local area respectively, to combine the global feature and the local feature in the last layer.

The feature extraction unit 104 extracts, with feature extraction layers set with respect to the global area, a global feature of the global area, and extracts, with a corresponding number of feature extraction layers set for each predetermined local area respectively, a local feature of each predetermined local area respectively. As shown by the arrow 1 in FIG. 2, a corresponding number of feature extraction layers are set for the global area, to extract a global feature of the global area; as shown by the arrow 2 in FIG. 2, a corresponding number of feature extraction layers are set for the local area including an eye, to extract a local feature of the local area; and as shown by the arrow 3 in FIG. 2, a corresponding number of feature extraction layers are set for the local area including a nose and a mouth, to extract a local feature of the local area.

As shown in FIG. 2, as an example, the global area, the local area including an eye, the local area including a nose and a mouth and the like of the sample image share feature extraction layers a and b of feature extraction layers set with respect to the global area and each predetermined local area respectively. In addition, the global area, the local area including an eye, the local area including a nose and a mouth and the like of the sample image may also share one of the feature extraction layers a and b. The global feature and each local feature are combined in the shared feature extraction layers a and b, such that a local feature of each local area serves as a supplementation to the global feature, and features of each sample image which are combined from the global feature and each local feature can precisely represent features of the sample image, thereby it is helpful for performing precise classification on the sample image, and a more robust classification model would be obtained, and further, a speed of training can be increased.

The loss determination unit 106 may be configured to calculate, with a loss determination layer, a loss function of the sample image based on combined features of each sample image, and to train the classification model based on the loss function.

As described above, combined features of the sample image not only include the global feature but also include the local features, and thus can precisely represent features of the sample image. Those skilled in the art should understand that, in a scenario of non-neural network, since combined features of the sample image not only include the global feature but also include the local features, there is no need to perform fusion on the features. While in a scenario of neural network, fusion may be further performed on the combined features of the sample image with a feature fusion layer (as an example, the feature fusion layer may be a fully connected layer of a convolutional neural network), to obtain fused features of the sample image. Accordingly, in the scenario of non-neural network, the loss determination unit 106 may calculate, with the combined features of each sample image, a loss function of the sample image. While in the scenario of neural network, the loss determination unit 106 may calculate, with the above fused features of each sample image, a loss function of the sample image. Further, in the loss determination unit 106, error back-propagation is performed with a loss value of the loss function calculated by the loss determination layer, to train the classification model. As an example, the loss function may be a softmax loss function. In addition, those skilled in the art can also envisage other examples of the loss function, which will not be repeatedly described herein.

In the prior art, a classification model which performs classification with a plurality of image blocks (i.e., the above-mentioned local areas) of a human face trains one classification model for each image block, and M classification models need to be trained when there are M image blocks, such that the amount of calculation is relatively large and thus the real-time performance of the system is influenced. In addition, upon occurrence of a problem such as a great change in postures (e.g., a side face), low resolution, poor quality (e.g., poor quality of a human face image which is caused by a disadvantageous illumination condition) and the like in an application scenario, the classification performance would be significantly lowered.

As can be seen from the above description, in the apparatus 100 for training a classification model according to the embodiment of the present disclosure, the global feature and each local feature are combined in the at least one feature extraction layer shared by the global area and the predetermined number of predetermined local areas, features of each sample image which are combined from the global feature and each local feature can precisely represent features of the sample image, thereby it is helpful for performing precise classification on the sample image, and a more robust classification model would be obtained. Even if a problem such as a great change in postures, low resolution, poor quality and the like occurs in an application scenario, a relatively excellent classification performance can be obtained. Further, since the global area and the predetermined number of predetermined local areas share at least one layer of feature extraction layers set with respect to the global area and each predetermined local area respectively, it is possible to reduce a number of parameters to be calculated and updated of the feature extraction layers, so as to make it possible to increase a speed of training.

Preferably, the training set comprises a plurality of training sets, among which at least two training sets at least partially overlap, the loss determination layer includes a plurality of loss determination layers corresponding to the plurality of training sets respectively, and the loss determination unit 106 is configured to, with respect to each sample image from the plurality of training sets, calculate a loss function of the sample image with a loss determination layer corresponding to a training set to which the sample image belongs.

At least two training sets among the plurality of training sets at least partially overlapping means that, there are same sample image(s) between the at least two training sets of the plurality of training sets, that is, there is cross data between the at least two training sets of the plurality of training sets. In presence of a plurality of training sets, by calculating a loss function of a sample image with a loss determination layer set with respect to a training set to which the sample image belongs, it is possible to ensure the sample image to be correctly classified.

Preferably, the plurality of training sets share at least one layer of feature extraction layers set with respect to the global area of the sample image in each training set.

Preferably, the plurality of training sets may also share at least one layer of feature extraction layers set with respect to at least one of the predetermined number of predetermined local areas of the sample image in each training set.

Figure 3:
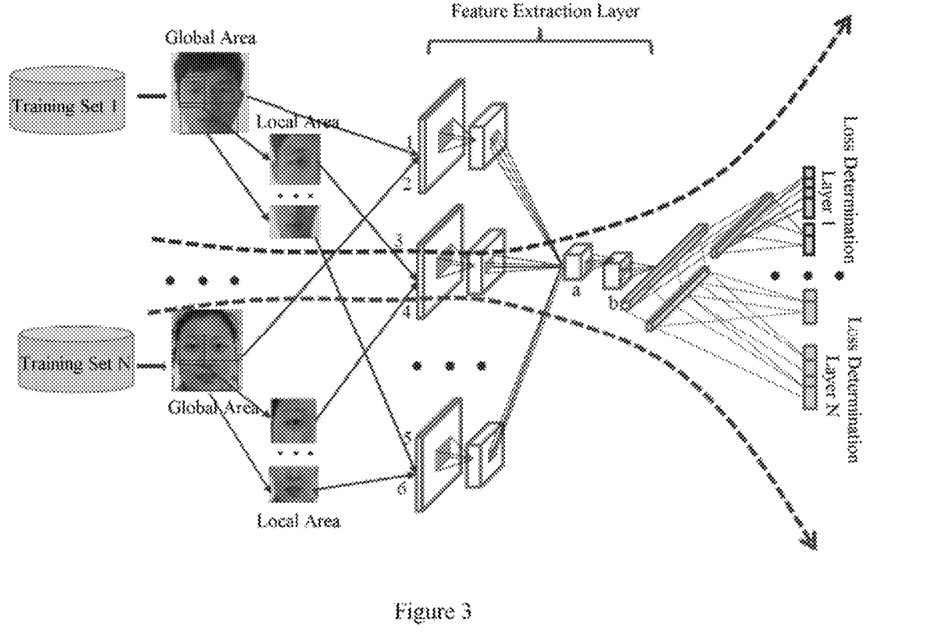
FIG. 3 is a view schematically showing another structural configuration example of the apparatus for training a classification model according to the embodiment of the present disclosure.

FIG. 3 is a view schematically showing another structural configuration example of the apparatus 100 for training a classification model according to the embodiment of the present disclosure.

As shown in FIG. 3, there are a training set 1, . . . , a training set N. As examples of sample images, FIG. 3 shows a male face image from the training set 1 and a female face image from the training set N. As an example, sample images may be selected in the manner of: randomly selecting batch face images from different training sets, wherein a number of images in each training set included in the batch face images depends on a size of the training set; for example, if a proportion between data amounts of sample images in the training set 1 and the training set N is 1:P, then a proportion between numbers of images in the training set 1 and the training set N in the batch face images is 1:P.

As shown in FIG. 3, a local area including an eye and a local area including a nose and a mouth and the like are obtained from each sample image. Moreover, corresponding numbers of feature extraction layers are set for a global area and each predetermined local area respectively.

For simplification, as an illustration but not a limitation, FIG. 3 shows that N training sets share feature extraction layers set, respectively, for a global area and each predetermined local area of a sample image in each training set. As an example, as shown by the arrow 1 and the arrow 2 in FIG. 3, global areas in the training set 1 and the training set N share feature extraction layers set for the global areas, as shown by the arrow 3 and the arrow 4 in FIG. 3, local areas including an eye of the sample images in the training set 1 and the training set N share feature extraction layers set for the local areas, and as shown by the arrow 5 and the arrow 6 in FIG. 3, local areas including a nose and a mouth of the sample images in the training set 1 and the training set N share feature extraction layers set for the local areas.

Taking training sets including human face data as an example, if there are many identical human face data between various training sets (that is, there is cross data between the training sets), in case of simply taking a plurality of training sets as one training set like in the prior art, a same human face existing in different training sets would be taken as different labeled data, thereby making it difficult for a training model to converge or making the performance of the model be lowered.

In the apparatus 100 for training a classification model according to the embodiment of the present disclosure, when a plurality of training sets are combined to form a larger training set, the plurality of training sets enable cross data between different training sets to be correctly classified, by sharing at least one feature extraction layer of feature extraction layers set for a global area of a sample image in each training set. That is, in the apparatus 100 for training a classification model according to the embodiment of the present disclosure, a plurality of training sets can be combined to perform training simultaneously, and cross data between different training sets is enabled to be correctly classified. Further, the plurality of training sets cause higher classification precision for cross data between different training sets to be correctly classified, by further sharing at least one feature extraction layer of feature extraction layers set with respect to at least one predetermined local area of the predetermined local areas of the sample image in each training set.

In addition, as an example, as shown in FIG. 3, the global area, the local area including an eye, the local area including a nose and a mouth and the like of the sample image share feature extraction layers a and b of feature extraction layers set with respect to the global area and each predetermined local area respectively. Further, the global area, the local area including an eye, the local area including a nose and a mouth and the like of the sample image may also share one of the feature extraction layers a and b of feature extraction layers set with respect to the global area and each predetermined local area respectively.

Further, FIG. 3 schematically shows loss determination layers corresponding to the N training sets respectively, i.e., loss determination layer 1, . . . , loss determination layer N. As described above, when a classification model is trained with a sample image, by calculating a loss function of the sample image with a loss determination layer corresponding to a training set to which the sample image belongs, it is possible to ensure the sample image to be correctly classified.

Preferably, the predetermined number of local areas have complementary information about the global area. This would cause the local features of the local areas to complement the global feature more comprehensively, such that features of each sample image which are combined from the global feature and each local feature can represent features of the sample image more precisely, so as to be helpful for performing more precise classification on the sample image.

Figure 4:
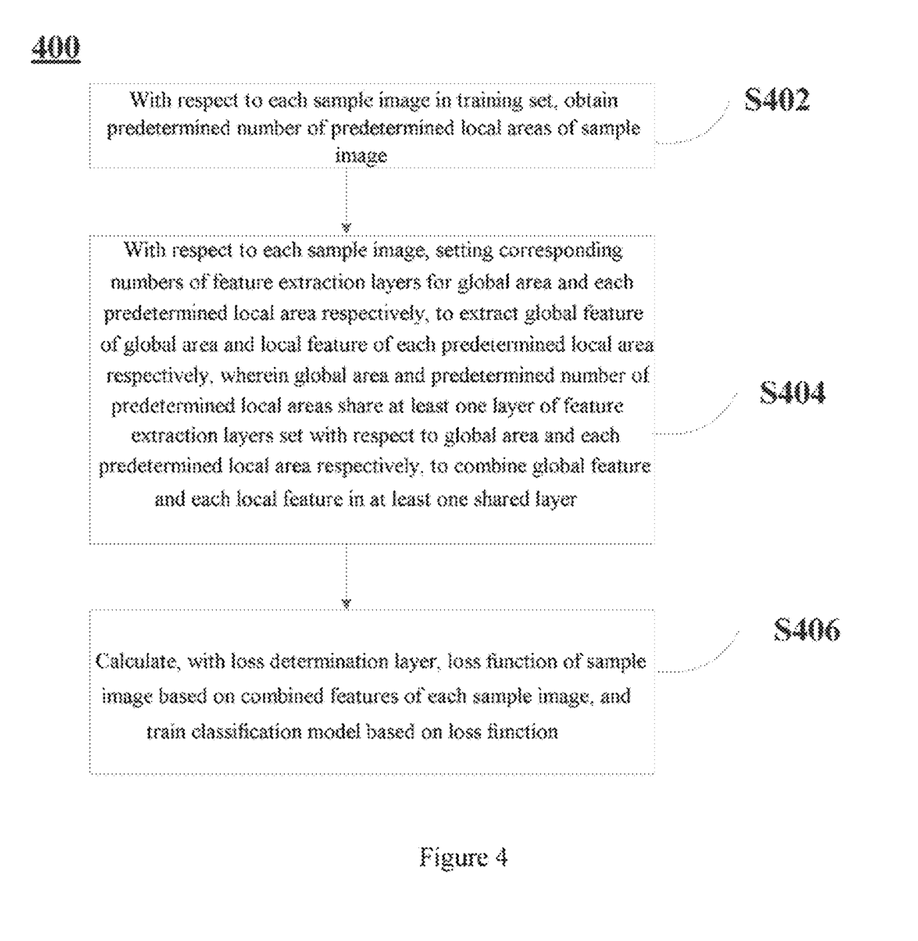
FIG. 4 is a flowchart showing an example of a flow of a method for training a classification model according to an embodiment of the present disclosure.

In correspondence to the above-mentioned embodiment of the apparatus for training a classification model, the present disclosure further provides the following embodiment of a method for training a classification model FIG. 4 is a flowchart showing an example of a flow of a method 400 for training a classification model according to an embodiment of the present disclosure.

As shown in FIG. 4, the method 400 for training a classification model according to the embodiment of the present disclosure includes a local area obtainment step S402, a feature extraction step S404, and a loss determination step S406.

In the local area obtainment step S402, with respect to each sample image in a training set, a predetermined number of predetermined local areas of the sample image are obtained, wherein each predetermined local area is a part of a global area of the sample image.

As an example, the global area is an entire area of the sample image, and the local area is a partial area of the entire area of the sample image.

Taking the sample image being a human face image as an example, a human face may be divided into a predetermined number of human face image blocks according to information on 5 key points (information on both eyes, a nose, and both mouth corners) of the human face, so as to obtain local areas, such as an area including an eye, an area including a nose, an area including a mouth and the like, of each sample image. The sample image may also be an image (e.g., a vehicle license plate image) other than a human face image. In the local area obtainment step S402, processing similar to the above-mentioned processing may be performed on an image other than a human face image.

In the feature extraction step S404, with respect to each sample image, corresponding numbers of feature extraction layers are set for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer.

As an example, the feature extraction layers may be convolution layers of a convolutional neural network. Those skilled in the art can understand that, the feature extraction layers may be other structures, which will not be repeatedly described herein.

For the specific example of setting corresponding numbers of feature extraction layers for the global area and each predetermined local area respectively as well as sharing feature extraction layer(s), reference may be made to the description in the corresponding portion, e.g., in regard to FIG. 2, in the above-mentioned apparatus embodiment, and repeated description will not be made herein.

In the loss determination step S406, with a loss determination layer, a loss function of the sample image is calculated based on combined features of each sample image, and the classification model is trained based on the loss function.

As described above, combined features of the sample image not only include the global feature but also include the local features, and thus can precisely represent features of the sample image. Those skilled in the art should understand that, in a scenario of non-neural network, since combined features of the sample image not only include the global feature but also include the local features, there is no need to perform fusion on the features. While in a scenario of neural network, fusion may be further performed on the combined features of the sample image with a feature fusion layer (as an example, the feature fusion layer may be a fully connected layer of a convolutional neural network), to obtain fused features of the sample image. Accordingly, in the scenario of non-neural network, in the loss determination step S406, a loss function of each sample image may be calculated, with the combined features of the sample image. While in the scenario of neural network, a loss function of each sample image may be calculated, with the above fused features of the sample image. Further, in the loss determination step S406, error back-propagation is performed with a loss value of the loss function calculated with the loss determination layer, to train the classification model.

In the prior art, a classification model which performs classification with a plurality of image blocks (i.e., the above-mentioned local areas) of a human face trains one classification model for each image block, and M classification models need to be trained for M image blocks, such that the amount of calculation is relatively large and thus the real-time performance of the system is influenced. In addition, upon occurrence of a problem such as a great change in postures, low resolution, poor quality and the like in an application scenario, the classification performance would be significantly lowered.

As can be seen from the above description, in the method 400 for training a classification model according to the embodiment of the present disclosure, the global feature and each local feature are combined in the at least one feature extraction layer shared by the global area and the predetermined number of predetermined local areas, features of each sample image which are combined from the global feature and each local feature can precisely represent features of the sample image, thereby it is helpful for performing precise classification on the sample image, and a more robust classification model would be obtained. Even if a problem such as a great change in postures, low resolution, poor quality and the like occurs in an application scenario, a relatively excellent classification performance can be obtained. Further, since the global area and the predetermined number of predetermined local areas share at least one layer of feature extraction layers set with respect to the global area and each predetermined local area respectively, it is possible to reduce a number of parameters to be calculated and updated of the feature extraction layers, so as to make it possible to increase a speed of training.

Preferably, the training set includes a plurality of training sets, among which at least two training sets at least partially overlap, the loss determination layer includes a plurality of loss determination layers corresponding to the plurality of training sets respectively, and in the loss determination step S406, with respect to each sample image from the plurality of training sets, a loss function of the sample image is calculated with a loss determination layer corresponding to a training set to which the sample image belongs.

At least two training sets among the plurality of training sets at least partially overlapping means that there are same sample image(s) between the at least two training sets of the plurality of training sets, that is, there is cross data between the at least two training sets of the plurality of training sets. In presence of a plurality of training sets, by calculating a loss function of a sample image with a loss determination layer set with respect to a training set to which the sample image belongs, it is possible to ensure the sample image to be correctly classified.

Preferably, the plurality of training sets share at least one layer of feature extraction layers set with respect to the global area of the sample image in each training set.

Preferably, the plurality of training sets may also share at least one layer of feature extraction layers set with respect to at least one of the predetermined number of predetermined local areas of the sample image in each training set.

Taking training sets including human face data as an example, if there are many identical human face data between various training sets (that is, there is cross data between the training sets), in case of simply taking a plurality of training sets as one training set like in the prior art, a same human face existing in different training sets would be taken as different labeled data, thereby making it difficult for a training model to converge or making the performance of the model be lowered.

In the method 400 for training a classification model according to the embodiment of the present disclosure, when a plurality of training sets are combined to form a larger training set, the plurality of training sets enable cross data between different training sets to be correctly classified, by sharing at least one feature extraction layer of feature extraction layers set for a global area of a sample image in each training set. That is, in the method 400 for training a classification model according to the embodiment of the present disclosure, a plurality of training sets can be combined to perform training simultaneously, and cross data between different training sets is enabled to be correctly classified. Further, the plurality of training sets cause higher classification precision for of cross data between different training sets to be correctly classified, by further sharing at least one feature extraction layer of feature extraction layers set with respect to at least one predetermined local area of the predetermined local areas of the sample image in each training set.

Preferably, the predetermined number of local areas have complementary information about the global area. This would cause the local features of the local areas to complement the global feature more comprehensively, such that features of each sample image which are combined from the global feature and each local feature can represent features of the sample image more precisely, so as to be helpful for performing more precise classification on the sample image.

Figure 5:
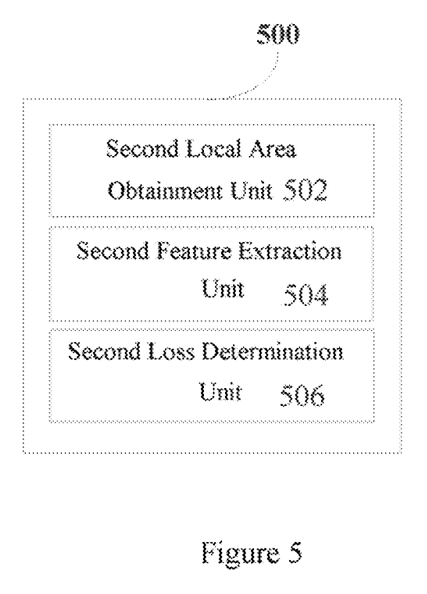
FIG. 5 is a block diagram showing a functional configuration example of an apparatus for classifying with a classification model trained in advance according to an embodiment of the present disclosure.

The present disclosure further provides an apparatus for classifying with a classification model. FIG. 5 is a block diagram showing a functional configuration example of an apparatus 500 for classifying with a classification model trained in advance according to the embodiment of the present disclosure. As shown in FIG. 5, the apparatus 500 for classifying with a classification model trained in advance according to the embodiment of the present disclosure includes a second local area obtainment unit 502, a second feature extraction unit 504, and a second loss determination unit 506. The classification model trained in advance may be a classification model obtained through training by, for example, the apparatus 100 for training a classifying model according to the above-mentioned embodiment of the present disclosure, or for example, the method 400 for training a classification model according to the above-mentioned embodiment of the present disclosure.

The second local area obtainment unit 502 may be configured to obtain a predetermined number of predetermined local areas of an image to be classified, wherein each predetermined local area is a part of a global area of the image to be classified.

As an example, the global area is an entire area of the sample image, and the local area is a partial area of the entire area of the sample image. Taking the image to be classified being a human face image as an example, local areas of the image to be classified include, for example, an area including an eye, an area including a nose, an area including a mouth, etc.

As an example, the feature extraction layers may be convolution layers of a convolutional neural network. Those skilled in the art can understand that, the feature extraction layers may be other structures, which will not be repeatedly described herein.

The second feature extraction unit 504 may be configured to extract, with corresponding numbers of feature extraction layers in the classification model which are set for the global area and each predetermined local area, a global feature of the global area and a local feature of each predetermined local area respectively, wherein in the classification model, the global area and the predetermined number of predetermined local areas share at least one layer of feature extraction layers set with respect to the global area and each predetermined local area respectively, to combine the global feature and each local feature in the at least one shared layer.

Specifically, the second feature extraction unit 504 extracts, with feature extraction layers set with respect to the global area in the classification model, a global feature of the global area, and extracts, with feature extraction layers set with respect to each predetermined local area in the classification model, a local feature of each predetermined local area respectively.

In the classification model, the global feature and each local feature are combined in the at least one layer shared by the global area and the predetermined number of predetermined local areas, such that a local feature of each local area serves as a supplementation to the global feature, and features of the image to be classified which are combined from the global feature and each local feature can precisely represent features of the image to be classified, thereby it is helpful for performing precise classification on the image to be classified, and a speed of classification can be increased.

The second loss determination unit 506 may be configured to calculate, with a loss determination layer in the classification model, a loss function of the image to be classified based on combined features of the image to be classified, and to classify the image to be classified based on the loss function.

As described above, combined features of the image to be classified not only include the global feature but also include the local features, and thus can precisely represent features of the image to be classified.

As can be seen from the above description, since in the training model, the global feature and each local feature are combined in the at least one feature extraction layer shared by the global area and predetermined local areas, features of each image to be classified which are combined from the global feature and each local feature can precisely represent features of the sample image. Therefore, the apparatus 500 for classifying with a classification model trained in advance according to the embodiment of the present disclosure is helpful for performing precise classification on the image to be classified, and further, a speed of classification can be increased.

Preferably, in a case where the classification model is obtained through training with a plurality of training sets, the loss determination layer in the classification model include a plurality of loss determination layers corresponding to the plurality of training sets respectively, and the plurality of training sets share at least one layer of feature extraction layers set with respect to the global area corresponding to each training set, and the second loss determination unit 506 is configured to calculate, with each loss determination layer of the plurality of loss determination layers, a loss function of the image to be classified based on combined features of the image to be classified, respectively, and to classify the image to be classified based on the loss function.

As an example, the second loss determination unit 506 may select a minimum loss function of the loss functions calculated from the plurality of loss determination layers, and take a class to which the minimum loss function corresponds as a class to which the image to be classified belongs.

In correspondence to the above-mentioned embodiment of the apparatus for classifying with a classification model, the present disclosure further provides the following embodiment of a method for classifying with a classification model.

Figure 6:
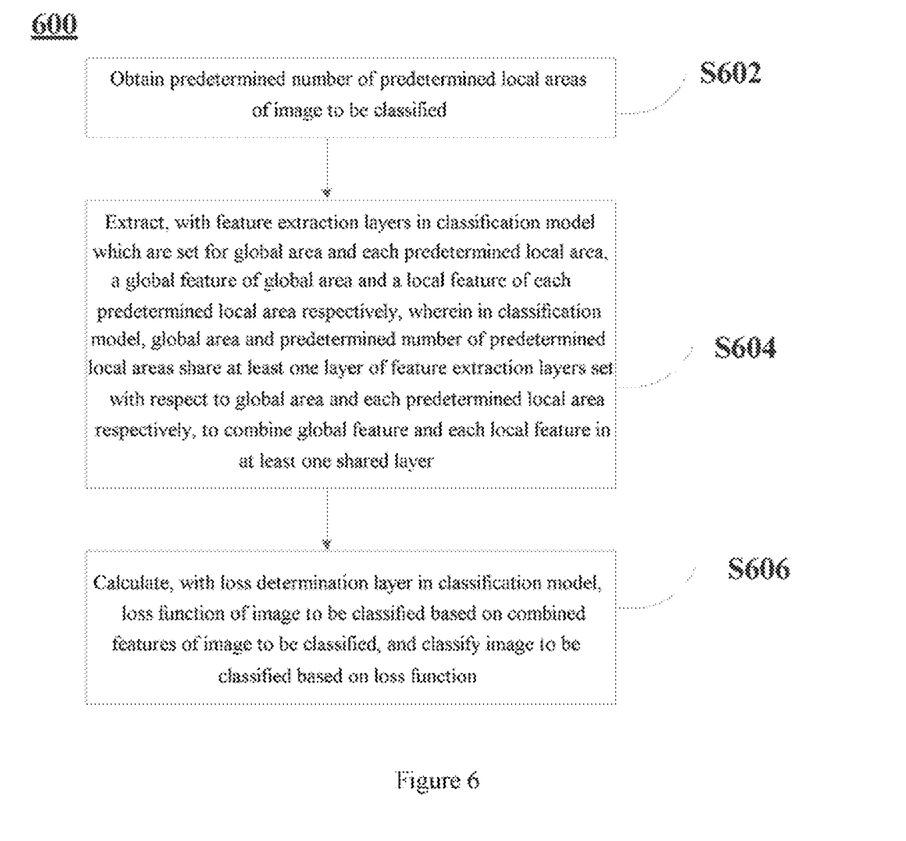
FIG. 6 is a flowchart showing an example of a flow of a method for classifying with a classification model trained in advance according to an embodiment of the present disclosure.

FIG. 6 is a flowchart showing an example of a flow of a method 600 for classifying with a classification model trained in advance according to an embodiment of the present disclosure.

As shown in FIG. 6, the method 600 for classifying with a classification model trained in advance according to the embodiment of the present disclosure includes a second local area obtainment step S602, a second feature extraction step S604, and a second loss determination step S606. The classification model trained in advance may be a classification model obtained through training by, for example, the apparatus 100 for training a classifying model according to the above-mentioned embodiment of the present disclosure, or for example, the method 400 for training a classification model according to the above-mentioned embodiment of the present disclosure.

In the second local area obtainment step S602, a predetermined number of predetermined local areas of an image to be classified are obtained, wherein each predetermined local area is a part of a global area of the image to be classified, and in the classification model, corresponding numbers of feature extraction layers are set for the global area and each predetermined local area respectively.

As an example, the global area is an entire area of the sample image, and the local area is a partial area of the entire area of the sample image. Taking the image to be classified being a human face image as an example, local areas of the image to be classified include, for example, an area including an eye, an area including a nose, an area including a mouth, etc.

As an example, the feature extraction layers may be convolution layers of a convolutional neural network. Those skilled in the art can understand that, the feature extraction layers may be other structures, which will not be repeatedly described herein.

In the second feature extraction step S604, a global feature of the global area and a local feature of each predetermined local area are extracted respectively with corresponding numbers of feature extraction layers in the classification model which are set for the global area and each predetermined local area, wherein in the classification model, the global area and the predetermined number of predetermined local areas share at least one layer of feature extraction layers set with respect to the global area and each predetermined local area respectively, to combine the global feature and each local feature in the at least one shared layer.

Specifically, a global feature of the global area is extracted with feature extraction layers set with respect to the global area in the classification model, and a local feature of each predetermined local area is extracted respectively with feature extraction layers set with respect to each predetermined local area in the classification model.

In the classification model, the global feature and each local feature are combined in the at least one layer shared by the global area and the predetermined number of predetermined local areas, such that a local feature of each local area serves as a supplementation to the global feature, and features of the image to be classified which are combined from the global feature and each local feature can precisely represent features of the image to be classified, thereby it is helpful for performing precise classification on the image to be classified, and a speed of classification can be increased.

In the second loss determination step S606, a loss function of the image to be classified is calculated, based on combined features of the image to be classified, with a loss determination layer in the classification model, and the image to be classified is classified based on the loss function As described above, combined features of the image to be classified not only include the global feature but also include the local features, and thus can precisely represent features of the image to be classified.

As can be seen from the above description, since in the training model the global feature and each local feature are combined in the at least one feature extraction layer shared by the global area and predetermined local areas, features of each image to be classified which are combined from the global feature and each local feature can precisely represent features of the sample image. Therefore, the method 600 for classifying with a classification model trained in advance according to the embodiment of the present disclosure is helpful for performing precise classification on the image to be classified, and further, a speed of classification can be increased.

Preferably, in a case where the classification model is obtained through training with a plurality of training sets, the loss determination layer in the classification model include a plurality of loss determination layers corresponding to the plurality of training sets respectively, and the plurality of training sets share at least one layer of feature extraction layers set with respect to the global area corresponding to each training set, and in the second loss determination step S606, a loss function of the image to be classified is calculated, respectively, based on combined features of the image to be classified, with each loss determination layer of the plurality of loss determination layers, and the image to be classified is classified based on the loss function.

As an example, in the second loss determination step S606, a minimum loss function of the loss functions calculated from the plurality of loss determination layers may be selected, and a class to which the minimum loss function corresponds may be taken as a class to which the image to be classified belongs.

It should be noted that, although the functional configurations and the operations of the apparatus and method for training a classification model and the apparatus and method for classifying with a classification model according to the embodiments of the present disclosure have been described above, this is only exemplary but not limiting, and those skilled in the art may carry out modifications on the above embodiments, for example may carry out additions, deletions or combinations the like on the functional modules and the operations in each embodiment, according to the principle of the present disclosure. Moreover, all of such modifications fall within the scope of the present disclosure.

Further, it should also be noted that, the method embodiment herein corresponds to the above-mentioned apparatus embodiment. Thus, for contents not described in detail in the method embodiment, reference may be made to the corresponding description in the apparatus embodiment, and repeated description will not be made herein.

Further, the present application further provides a storage medium and a product program. Machine executable instructions in the storage medium and the program product according to the embodiments of the present disclosure may be configured to implement the above-mentioned method. Thus, for contents not described in detail herein, reference may be made to the foregoing corresponding description, and repeated description will not be made herein.

Accordingly, a storage medium for carrying the above-mentioned program product comprising machine executable instructions is also included in the disclosure of the present invention. The storage medium includes, but is not limited to, a floppy disc, an optical disc, a magnetic optical disc, a memory card, a memory stick and the like.

Figure 7:
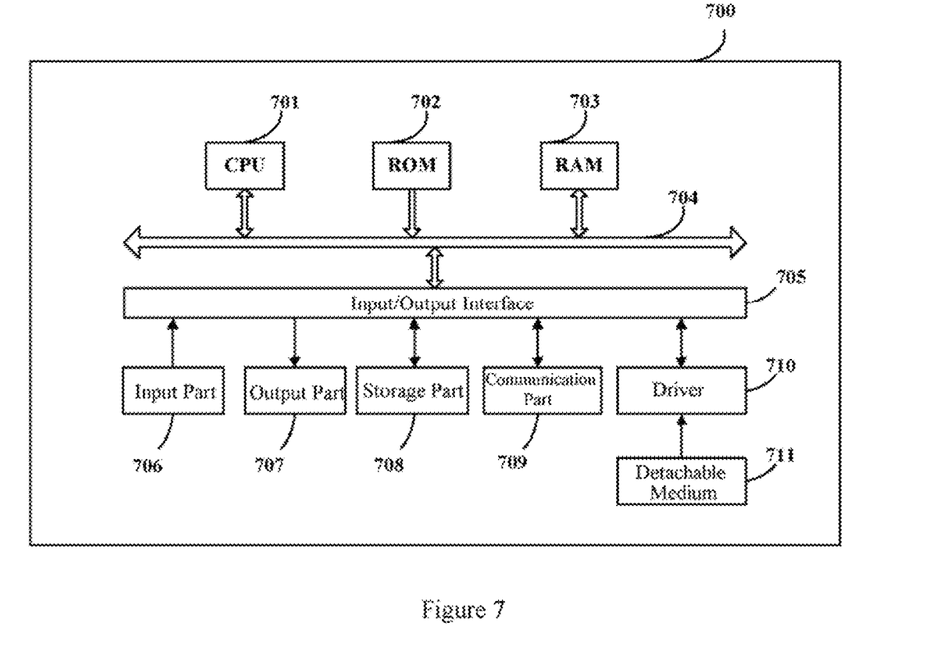
FIG. 7 is a block diagram showing an exemplary structure of a personal computer that may be used in the embodiments of the present disclosure.

In addition, it should also be noted that, the above series of processing and apparatuses may also be implemented by software and/or firmware. In the case of implementation by software and/or firmware, a program constituting the software is installed from a storage medium or a network to a computer having a dedicated hardware structure, for example the universal personal computer 700 as shown in FIG. 7. The computer, when installed with various programs, can execute various functions and the like.

In FIG. 7, a Central Processing Unit (CPU) 701 executes various processing according to programs stored in a Read-Only Memory (ROM) 702 or programs loaded from a storage part 708 to a Random Access Memory (RAM) 703. In the RAM 703, data needed when the CPU 701 executes various processing and the like is also stored according to requirements.

The CPU 701, the ROM 702 and the RAM 703 are connected to each other via a bus 704. An input/output interface 705 is also connected to the bus 704.

The following components are connected to the input/output interface 705: an input part 706, including a keyboard, a mouse and the like; an output part 707, including a display, such as a Cathode Ray Tube (CRT), a Liquid Crystal Display (LCD) and the like, as well as a speaker and the like; the storage part 708, including a hard disc and the like; and a communication part 709, including a network interface card such as an LAN card, a modem and the like. The communication part 709 executes communication processing via a network such as the Internet.

According to requirements, a driver 710 is also connected to the input/output interface 705. A detachable medium 711 such as a magnetic disc, an optical disc, a magnetic optical disc, a semiconductor memory and the like is installed on the driver 710 according to requirements, such that a computer program read therefrom is installed in the storage part 708 according to requirements.

In a case where the foregoing series of processing is implemented by software, a program constituting the software is installed from a network such as the Internet or a storage medium such as the detachable medium 711.

Those skilled in the art should understand that, such a storage medium is not limited to the detachable medium 711 in which a program is stored and which is distributed separately from an apparatus to provide the program to a user as shown in FIG. 7. Examples of the detachable medium 711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be a hard disc included in the ROM 702 and the memory part 708, in which a program is stored and which is distributed together with the apparatus containing it to a user.

Preferred embodiments of the present disclosure have been described above with reference to the drawings. However, the present disclosure of course is not limited to the foregoing examples. Those skilled in the art can obtain various alterations and modifications within the scope of the appended claims, and it should be understood that these alterations and modifications naturally will fall within the technical scope of the present disclosure.

For example, in the above-mentioned embodiments, a plurality of functions incorporated in one unit may be implemented by separate apparatuses. Alternatively, in the foregoing embodiments, a plurality of functions implemented by a plurality of units may be implemented by separate apparatuses, respectively. In addition, one of the above functions may be implemented by a plurality of units. Undoubtedly, such configurations are included within the technical scope of the present disclosure.

In the specification, the steps described in the flowchart not only include processing executed in the described order according to a time sequence but also include processing executed in parallel or separately but not necessarily according to a time sequence. In addition, even if in steps in which processing is executed according to a time sequence, the order undoubtedly can be appropriately changed.

In addition, the technology of the present disclosure may also be configured as follows.

Appendix 1. An apparatus for training a classification model, comprising:

a local area obtainment unit configured to, with respect to each sample image in a training set, obtain a predetermined number of predetermined local areas of the sample image, wherein each predetermined local area is a part of a global area of the sample image;

a feature extraction unit configured to, with respect to each sample image, set corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination unit configured to calculate, with a loss determination layer, a loss function of the sample image based on combined features of each sample image, and to train the classification model based on the loss function.

Appendix 2. The apparatus for training a classification model according to Appendix 1, wherein the training set comprises a plurality of training sets, among which at least two training sets at least partially overlap, the loss determination layer comprises a plurality of loss determination layers corresponding to the plurality of training sets respectively, and the loss determination unit is configured to, with respect to each sample image from the plurality of training sets, calculate a loss function of the sample image with a loss determination layer corresponding to a training set to which the sample image belongs.

Appendix 3. The apparatus for training a classification model according to Appendix 2, wherein the plurality of training sets share at least one layer of feature extraction layers set with respect to the global area of the sample image in each training set.

Appendix 4. The apparatus for training a classification model according to Appendix 3, wherein the plurality of training sets also share at least one layer of feature extraction layers set with respect to at least one of the predetermined number of predetermined local areas of the sample image in each training set.

Appendix 5. The apparatus for training a classification model according to Appendix 1, wherein the predetermined number of local areas have complementary information about the global area.

Appendix 6. The apparatus for training a classification model according to Appendix 1, wherein the feature extraction layers are convolution layers of a convolutional neural network.

Appendix 7. A method for training a classification model, comprising:

a local area obtainment step of, with respect to each sample image in a training set, obtaining a predetermined number of predetermined local areas of the sample image, wherein each predetermined local area is a part of a global area of the sample image;

a feature extraction step of, with respect to each sample image, setting corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination step of calculating, with a loss determination layer, a loss function of the sample image based on combined features of each sample image, and training the classification model based on the loss function.

Appendix 8. The method for training a classification model according to Appendix 7, wherein the training set comprises a plurality of training sets, among which at least two training sets at least partially overlap, the loss determination layer comprises a plurality of loss determination layers corresponding to the plurality of training sets respectively, and in the loss determination step, with respect to each sample image from the plurality of training sets, a loss function of the sample image is calculated with a loss determination layer corresponding to a training set to which the sample image belongs.

Appendix 9. The method for training a classification model according to Appendix 8, wherein the plurality of training sets share at least one layer of feature extraction layers set with respect to the global area of the sample image in each training set.

Appendix 10. The method for training a classification model according to Appendix 9, wherein the plurality of training sets also share at least one layer of feature extraction layers set with respect to at least one of the predetermined number of predetermined local areas of the sample image in each training set.

Appendix 11. The method for training a classification model according to Appendix 7, wherein the predetermined number of local areas have complementary information about the global area.

Appendix 12. The method for training a classification model according to Appendix 7, wherein the feature extraction layers are convolution layers of a convolutional neural network.

Appendix 13. An apparatus for classifying with a classification model, comprising:

a second local area obtainment unit configured to obtain a predetermined number of predetermined local areas of an image to be classified, wherein each predetermined local area is a part of a global area of the image to be classified;

a second feature extraction unit configured to extract, with corresponding numbers of feature extraction layers in the classification model which are set for the global area and each predetermined local area, a global feature of the global area and a local feature of each predetermined local area respectively, wherein in the classification model, the global area and the predetermined number of predetermined local areas share at least one layer of the corresponding numbers of feature extraction layers set with respect to the global area and each predetermined local area respectively, to combine the global feature and each local feature in the at least one shared layer; and a second loss determination unit configured to calculate, with a loss determination layer in the classification model, a loss function of the image to be classified based on combined features of the image to be classified, and to classify the image to be classified based on the loss function.

Appendix 14. The apparatus for classifying with a classification model according to Appendix 13, in a case where the classification model is obtained through training with a plurality of training sets, the loss determination layer in the classification model comprises a plurality of loss determination layers corresponding to the plurality of training sets respectively, and the plurality of training sets share at least one layer of feature extraction layers set with respect to the global area corresponding to each training set, and the second loss determination unit is configured to respectively calculate, with each loss determination layer of the plurality of loss determination layers, a loss function of the image to be classified based on combined features of the image to be classified, and to classify the image to be classified based on the loss function.

The invention claimed is:

1. An apparatus for training a classification model, comprising:

a local area obtainment unit configured to, with respect to each sample image in a training set, obtain a predetermined number of predetermined local areas of the sample image, wherein each predetermined local area is a part of a global area of the sample image;

a feature extraction unit configured to, with respect to each sample image, set corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination unit configured to calculate, with a loss determination layer, a loss function of the sample image based on combined features of each sample image, and to train the classification model based on the loss function.

2. The apparatus for training a classification model according to claim 1, wherein the training set comprises a plurality of training sets, among which at least two training sets at least partially overlap, the loss determination layer comprises a plurality of loss determination layers corresponding to the plurality of training sets respectively, and the loss determination unit is configured to, with respect to each sample image from the plurality of training sets, calculate a loss function of the sample image with a loss determination layer corresponding to a training set to which the sample image belongs.

3. The apparatus for training a classification model according to claim 2, wherein the plurality of training sets share at least one layer of feature extraction layers set with respect to the global area of the sample image in each training set.

4. The apparatus for training a classification model according to claim 3, wherein the plurality of training sets also share at least one layer of feature extraction layers set with respect to at least one of the predetermined number of predetermined local areas of the sample image in each training set.

5. The apparatus for training a classification model according to claim 1, wherein the predetermined number of local areas have complementary information about the global area.

6. The apparatus for training a classification model according to claim 1, wherein the feature extraction layers are convolution layers of a convolutional neural network.

7. A method for training a classification model, comprising:

a local area obtainment step of, with respect to each sample image in a training set, obtaining a predetermined number of predetermined local areas of the sample image, wherein each predetermined local area is a part of a global area of the sample image;

a feature extraction step of, with respect to each sample image, setting corresponding numbers of feature extraction layers for the global area and each predetermined local area respectively, to extract a global feature of the global area and a local feature of each predetermined local area respectively, wherein the global area and the predetermined number of predetermined local areas share at least one layer of the corresponding numbers of feature extraction layers set with respect to the global area and each predetermined local area respectively, to combine the global feature and each local feature in the at least one shared layer; and a loss determination step of calculating, with a loss determination layer, a loss function of the sample image based on combined features of each sample image, and training the classification model based on the loss function.

8. The method for training a classification model according to claim 7, wherein the training set comprises a plurality of training sets, among which at least two training sets at least partially overlap, the loss determination layer comprises a plurality of loss determination layers corresponding to the plurality of training sets respectively, and in the loss determination step, with respect to each sample image from the plurality of training sets, a loss function of the sample image is calculated with a loss determination layer corresponding to a training set to which the sample image belongs.

9. The method for training a classification model according to claim 8, wherein the plurality of training sets share at least one layer of feature extraction layers set with respect to the global area of the sample image in each training set.

10. The method for training a classification model according to claim 9, wherein the plurality of training sets also share at least one layer of feature extraction layers set with respect to at least one of the predetermined number of predetermined local areas of the sample image in each training set.

11. The method for training a classification model according to claim 7, wherein the predetermined number of local areas have complementary information about the global area.

12. The method for training a classification model according to claim 7, wherein the feature extraction layers are convolution layers of a convolutional neural network.

13. An apparatus for classifying with a classification model, comprising:

a second local area obtainment unit configured to obtain a predetermined number of predetermined local areas of an image to be classified, wherein each predetermined local area is a part of a global area of the image to be classified;

a second feature extraction unit configured to extract, with corresponding numbers of feature extraction layers in the classification model which are set for the global area and each predetermined local area, a global feature of the global area and a local feature of each predetermined local area respectively, wherein in the classification model, the global area and the predetermined number of predetermined local areas share at least one layer of the corresponding numbers of feature extraction layers set with respect to the global area and each predetermined local area respectively, to combine the global feature and each local feature in the at least one shared layer; and a second loss determination unit configured to calculate, with a loss determination layer in the classification model, a loss function of the image to be classified based on combined features of the image to be classified, and to classify the image to be classified based on the loss function.

14. The apparatus for classifying with a classification model according to claim 13, in a case where the classification model is obtained through training with a plurality of training sets, the loss determination layer in the classification model comprises a plurality of loss determination layers corresponding to the plurality of training sets respectively, and the plurality of training sets share at least one layer of feature extraction layers set with respect to the global area corresponding to each training set, and the second loss determination unit is configured to respectively calculate, with each loss determination layer of the plurality of loss determination layers, a loss function of the image to be classified based on combined features of the image to be classified, and to classify the image to be classified based on the loss function.

\* \* \* \* \*